United States Patent

Heitmann et al.

[15] 3,671,750
[45] June 20, 1972

[54] METHOD OF SYNCHRONIZING THE CHANGE OF DIGITS IN ABSOLUTE-VALUE MEASURING DEVICES AND APPARATUS THEREFOR

[72] Inventors: Knut Heitmann, Wetzlar; Eckart Schneider, Berghausen, both of Germany

[73] Assignee: Ernst Leitz GmbH, Wetzlar, Germany

[22] Filed: July 20, 1970

[21] Appl. No.: 56,372

[30] Foreign Application Priority Data

July 29, 1969 Germany ..................... P 19 38 377.8

[52] U.S. Cl. ........................ 250/237 R, 250/219 D, 356/169
[51] Int. Cl. .......................................................... H01j 5/16
[58] Field of Search ............ 250/219 R, 219 D, 219 DD, 229, 250/237 R, 237 G; 350/169, 170, 171

[56] References Cited

UNITED STATES PATENTS 3,342,978  9/1968  Cameron ........................ 250/219 D Primary Examiner—James W. Lawrence
Assistant Examiner—D. C. Nelms
Attorney—Krafft & Wells

[57] ABSTRACT

A method of synchronizing the change of digits in the indicator of absolute-value measuring devices. The method makes use of three possible electrical signals of different amplitude level obtained from scanning at least one track of markings subdividing the track to a certain degree of fineness, and of a control signal obtained from scanning a track of higher fineness. The combined signals control a threshold value discriminator of which the output signal is used for changing the digits. An apparatus for practicing the method comprises a displaceable record carrier having tracks of different degrees of fineness thereon with only one sensing means associated with each track. Each sensing means is connected to a summing circuit stage which, further, is in connection with the sensing means associated with the track of higher fineness. The summing circuit stage is, in turn, connected to the threshold value discriminator.

6 Claims, 6 Drawing Figures

KNUT HEITMANN
ECKART SCHNEIDER
    INVENTORS

BY Krafft + Wells

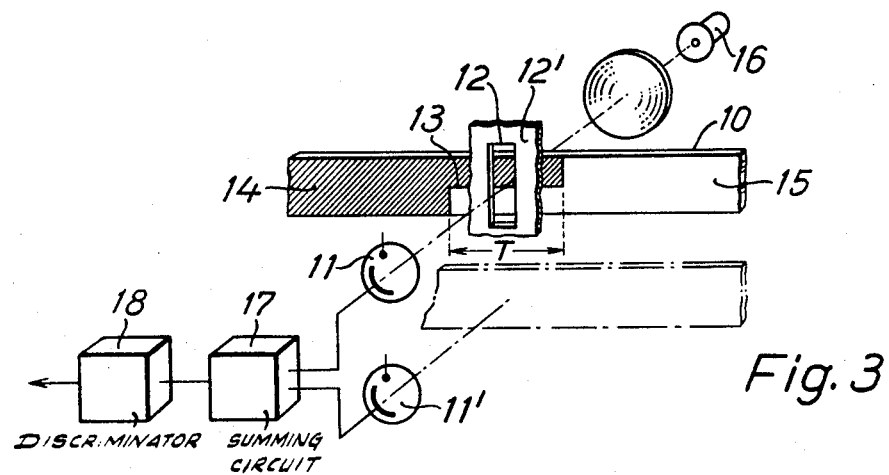
Fig. 3
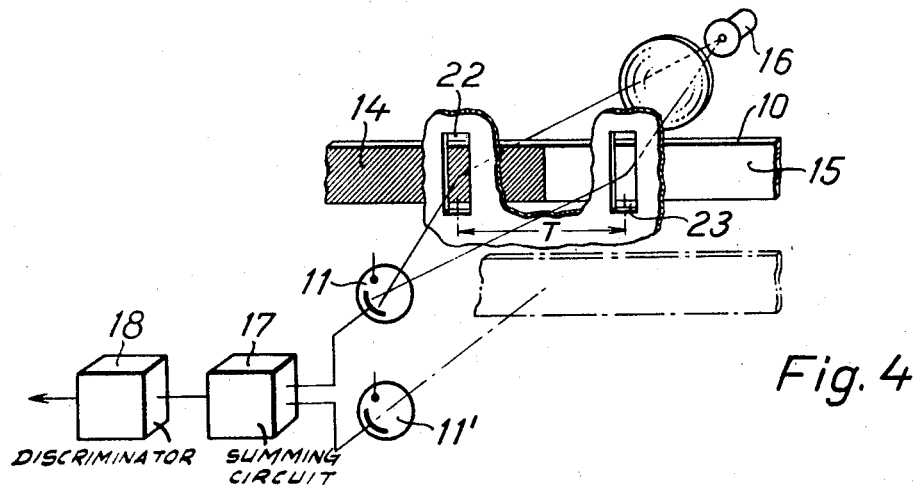
Fig. 4
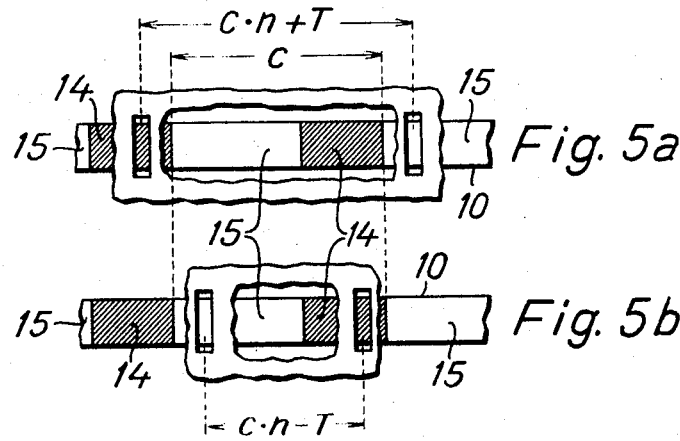
Fig. 5a
Fig. 5b

METHOD OF SYNCHRONIZING THE CHANGE OF DIGITS IN ABSOLUTE-VALUE MEASURING DEVICES AND APPARATUS THEREFOR

BACKGROUND OF THE INVENTION

The present invention relates to a method of measuring a parameter of an object and indicating the value of the measured parameter in digital presentation and to apparatus for performing the method.

In digital measuring systems, it is possible for several digits of the number to change at the same time when changing from one number to the next. The same is also true for coded representations of numbers such as are used to an increasing extent in modern measurement engineering. In the case of binary coding, for example, when changing from binary 7 to binary 8, four digits of the symbolic representation change at the same time. If one scans a record support provided with scale markings and uses a simple scanning slot, then as a rule an absolutely simultaneous change of the four digits does not take place because the tracks of the record support are not aligned with one another with the requisite degree of accuracy due to normal manufacturing tolerances. One is therefore compelled to use additional aids for obtaining an unambiguous presentation.

A well known method of obtaining such presentation from record carriers having tracks thereon is the socalled V-sensing method. For performing this method two sensing means are associated with each track, except the track which has the highest degree of fineness with which only one sensing means is associated. The latter is connected to a digital circuit and when a signal is received by it one of the two receivers associated with the next track is switched on for sensing. The newly switched-on sensing means supplies its output signal to a further digital circuit which, in turn, switches on the sensing means of the next track, and so on. In this manner the presentation of each track is obtained from the momentary position of the sensing means relative to the record carrier. By subsequent scanning of the sensing means associated with each individual track the data of the position of the record carrier is obtained. This prior-art method is rather complicated with regard to the required elements.

In another known method one particular track, associated with an additional sensing means, is allocated to each decade. Thereby the number of the required sensing means is considerably reduced, however an additional track per decade must be provided on the record carrier. This requires additional space on the record carrier and, moreover, all tracks must be precisely aligned to one another, thereby rendering the production more difficult.

It is, therefore, an object of the present invention to provide a new method of synchronizing the change of digits in absolute-value measuring devices which overcomes the above described disadvantages.

SUMMARY OF THE INVENTION

The above stated object is attained by a method of measuring a parameter of an object and indicating the value of the measured parameter in digital presentation, comprising the steps of causing a record carrier provided with a set of at least two tracks, which each carry markings subdividing the tracks to different degrees of fineness, to be displaced in response to the value of the parameter or quantity, scanning each track by an individual sensing means, each sensing means associated with any but the most finely divided track being responsive to the sensing of the absence or presence or quantity of one said marking by providing a corresponding electrical output signal respectively at either below a first amplitude level or above a second amplitude level higher than said first level or at an amplitude level intermediate said first and second levels, the sensing means associated with the most finely divided track being responsive to the sensing of the absence or presence of a mark by providing a corresponding electrical control signal respectively at either below the first level or at the intermediate level, applying the output signal or signals and the control signal via a summing circuit stage to a discriminator circuit having a threshold value such as to provide a response signal only in the presence of an output signal in excess of said second level or in the simultaneous presence of a control signal and an output signal of said intermediate level, and applying said response signal to means indicative of the position of the track associated with said output signal.

According to the invention, there is further provided an arrangement for carrying out the method, the arrangement comprising a record carrier, which is displaceable in response to the value of the parameter to be measured and which is provided with a set of at least two tracks each carrying markings subdividing the tracks to different degrees of fineness, sensing means individually associated with each track to scan the markings thereon, each sensing means associated with any but the most finely divided track being responsive to the sensing of the absence or presence or proximity of one said marking by providing a corresponding electrical output signal respectively at either below a first amplitude level or above a second amplitude level higher than said first level or at an amplitude level intermediate said first and second levels, the sensing means associated with the most finely divided track being responsive to the sensing of the absence or presence of a mark by providing a corresponding electrical control signal respectively at either below the first level or at the intermediate level, means applying the output signal or signals and the control signal via a summing circuit stage to a discriminator circuit having a threshold value such as to provide a response signal only in the presence of an output signal in excess of said second level or in the simultaneous presence of a control signal and an output signal of said intermediate level, and means applying said response signal to means indicative of the position of the track associated with said output signal.

According to one refinement of the invention, for the production of the output signals at three different levels, each but the most finely divided tracks may be provided with markings of intermediate value at each transition between the presence and the absence of a marking, and each sensing means associated with any but the most finely divided track may be arranged to scan the respectively associated track through a slit.

According to another refinement of the invention, the production of the output signals at three different levels, each sensing means associated with any but the most finely divided track is arranged to scan the respectively associated track through a stepped slit.

According to yet another refinement of the invention, for the production of the output signals at three different levels, each sensing means associated with any but the most finely divided track is arranged to scan the respectively associated track through at least two slits spaced apart in the direction of the displacement of the second carrier relative to the scanning means.

BRIEF DESCRIPTION OF THE DRAWINGS

The invention will be more readily comprehended from the following description when taken in conjunction with the appending drawings, wherein:

FIG. 3 illustrates schematically one embodiment of apparatus for performing the method according to the invention, FIG. 4 illustrates schematically a further embodiment of such apparatus, and FIGS. 5a and 5b each illustrate a modification of the apparatus illustrated by FIG. 3.

DESCRIPTION OF THE PREFERRED EMBODIMENTS

Figure 1:
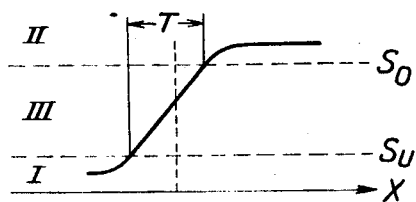
FIG. 1 illustrates by electrical waveforms the problem to be dealt with in the performance of the invention.
Figure 1:
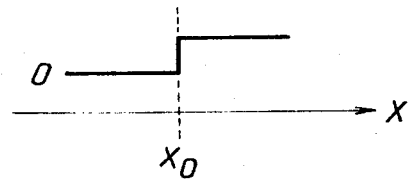

The invention proceeds from the fact that a sensing means may respond not only to two but to more different kinds of signals by the production of electric signals of different levels. If one has a coarsely subdivided and a finely subdivided track side by side on a record support, then on the record support being displaced in the direction of the tracks and relatively to the sensing means associated with the tracks, signals are obtained as shown diagrammatically in FIG. 1 when slots of different widths are used. Whereas during such a displacement, the signal from the scanning of the finely subdivided track changes as a step function, the transition of the signal from the scanning of the coarsely subdivided track is spread over a longer distance of displacement, so that one obtains a relatively slowly rising front edge for the output signal pulse of the sensing means. If now one fixes two levels $S_o$ and $S_u$ which are within the dynamic range of the output signal of the sensing means, one can define three signals or signal ranges I, II and III, which differ in their level. The signal III specifies the tolerance range T, in which at any point the stepping of the coarse figure digit must take place, namely according to the signal 0 which results from the scanning of the finely subdivided track and which changes its level abruptly at the point $X_o$ of the record support.

Now it is known that the exceeding of a level can be detected the more accurately, the steeper the rising flank of the exceeding signal. Moreover, it is required that the threshold value of the discriminator circuit should be reached by an output signal III only in combination with the control signal obtained from the scanning of the finely subdivided track. For these reasons, one should aim at a signal originating from the scanning of the coarsely subdivided track like that shown in FIG. 2. In this case, it is desirable for the tolerance range T here to be considerably wider than in FIG. 1. Furthermore, the signal level within this tolerance range is accurately defined and its value is practically constant. Such a waveform of the output signal III can be obtained in various ways.

Figure 2:
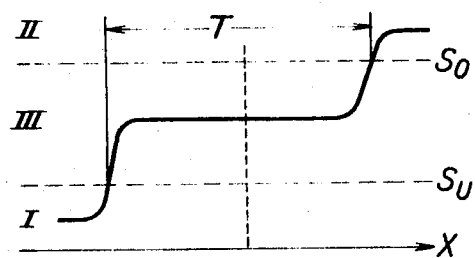
FIG. 2 illustrates by electrical waveforms the principle of the solution of the problem provided by the present invention.
Figure 2:
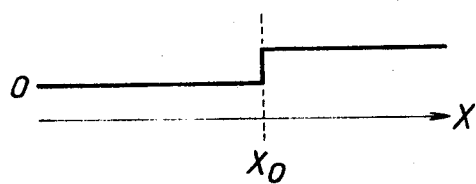

FIG. 3 shows one arrangement of suitable apparatus in which the sensing means are photo-electric receivers. A photo-electric receiver 11 associated with a coarsely subdivided track 10 has allocated to it a gap 12 in a shutter 12'. Furthermore, at value change-over of the track located in the range T, a marking 13, of a value intermediate that of the presence and of the absence of a mark, determines the tolerance range T by the space it covers in the transitional range. If the part 14 of the track is located behind the gap 12, no light from a lamp 16 can reach the photo-electric receiver 11. Its output signal is thus the signal I. If the division is located behind the gap in the position shown, the receiver emits the output signal III. Only when the part 15 of the track is located behind the slot 12 is the receiver fully active and supplies the output signal II. The succession of the signals I, III and II gives the desired course of the level at the output of the receiver 11 as shown in FIG. 2.

Instead of the straight slot, one may alternatively use a stepped slot and in this case dispense with the intermediate value marking on the track.

FIG. 4 shows an embodiment of the apparatus, in which the coarse division is carried out without an intermediate value marking. In order to obtain the desired waveform of the output signal here, two slots 22 and 23, which are rigidly coupled together, are associated with the receiver 11. Their distance from one another is such that, for a desired tolerance range T, there is only a partial modulation of the receiver 11, because both the opaque part 14 and also the transparent part 15 take part simultaneously in the signal formation.

The manner in which the distance between the slots can be differently arranged relative to the marking division intervals, is illustrated in FIGS. 5a and 5b. FIG. 5a shows one arrangement, in which the distance between the two slots 22 and 23 is greater than a division interval C of the division. It is $C·n+T$, in which n is an integer. In the example illustrated by FIG. 5b, the distance between the slots is $C·n+T$. Instead of the two slots shown, it is also possible to use two groups of slots, the slots within a group always being staggered in relation to one another by C or $C·n$, and the two groups having the above-mentioned distances $C·n+T$ or $C·n-T$, respectively.

Although the function of the arrangements has been described in relation to optical apparatus and photoelectric sensing means, the method may also be performed to advantage with other types of apparatus, for example with magnetic recording, and sensing means of appropriate type.

We claim:

1. A method of synchronizing the change of digits in absolute-value measuring devices comprising the steps of;

causing a record carrier provided with a set of at least two tracks each of which carry marking subdividing the tracks to different degrees of fineness to be displaced in response to the value to be measured, scanning each track other than the most finely divided by an individual associated light scanning means responsive to the quantity of the marking sensed to generate an electrical output signal of first, second or third magnitude, generating an output signal of first magnitude below a predetermined first level in response to the absence of a mark quantity, generating an output signal of third magnitude above a predetermined second level in response to the presence of a full mark quantity, generating an output signal of second magnitude intermediate the first predetermined level and the second predetermined level in response to the presence of a half mark quantity, scanning the most finely divided track by an individual associated light scanning means responsive to the absence or presence of a mark to generate an electrical control signal of first or second magnitude, generating a control signal of first magnitude below a first predetermined level in response to the absence of a sensed mark, generating a control signal of second magnitude intermediate a first and second predetermined level in response to the presence of a sensed mark, conducting the output signal and the control signal via a summing circuit stage to a discriminator circuit stage having a predetermined threshhold value, generating a response signal in response to the presence of an output signal in excess of said second predetermined level or to the simultaneous presence of an output signal and a control signal of said intermediate level.

2. Apparatus for synchronizing the change of digits in an absolute value measuring device comprising a record carrier displaceable in response to the quantity of the value to be measured, at least two information carrying tracks positioned on said record carrier, coded markings on said tracks subdividing said tracks into different degrees of fineness, said markings being full marks, half marks and no marks, light sensing means associated individually with each track to scan the marking thereon, each light sensing means associated with other than the most finely divided track being responsive to the type of mark sensed to generate an electrical output of first, second or third magnitude representative of the absence of a mark, presence of a half mark or presence of a full mark respectively, fine track light sensing means associated with the most finely divided track being responsive to the absence or presence of a corresponding mark on said track to generate one electrical control signal of first or second magnitude respectively, said signal of first magnitude being of a quantity below a first predetermined level, said signal of third magnitude being of a quantity above a second predetermined level, and said signal of second magnitude being of a quantity intermediate said first predetermined level and said second predetermined level, means conducting the output signal and the control signal via a summing circuit to a discriminator circuit having a predetermined threshhold value whereby the presence of an output signal in excess of said second level or the simultaneous presence of a control signal and an output signal of second magnitude will cause said discriminator circuit to generate a response signal, and means conducting said response signal to means digitally indicative of the position of the track associated with said output signal.

3. An apparatus as claimed in claim 2, wherein for the production of the output signals at three different levels, each but the most finely divided tracks are provided with markings of intermediate value at each transition between the presence and the absence of a marking, and wherein each sensing means associated with other than the most finely divided track is arranged to scan the respectively associated track through a slit.

4. Apparatus for synchronizing the change of digits in an absolute-value measuring device comprising a record carrier displaceable in response to the quantity of the value to be measured, at least two information carrying tracks positioned on said record carrier, coded markings on said tracks subdividing said tracks into different degrees of fineness, light sensing means associated with each track other than the most finely divided track responsive to the presence or absence of one or two markings to generate an electrical output signal of the first magnitude representative of the absence of any sensed marking, an electrical output signal of the second magnitude representative of the presence of a single marking and an electrical output signal of the third magnitude representative of the presence of two markings, light sensing means associated with the most finely divided track being responsive to the absence or presence of a corresponding mark on said track to generate an electrical control signal of first or second magnitude respectively, said signal of first magnitude being of a quantity below a first predetermined level, said signal of third magnitude being of a quantity above a second predetermined level, and said signal of second magnitude being of a quantity intermediate said first predetermined level and said second predetermined level, means conducting the output signal and the control signal via a summing circuit to a discriminator circuit having a predetermined threshhold value whereby the presence of an output signal in excess of said second level or the simultaneous presence of a control signal and an output signal of second magnitude will cause said discriminator circuit to generate a response signal, and means conducting said response signal to means digitally indicative of the position of the track associated with said output signal.

5. An apparatus as claimed in claim 4, wherein for the production of the output signals at three different levels, each sensing means associated with other than the most finely divided track is arranged to scan the respectively associated track through a stepped slit.

6. An apparatus as claimed in claim 4, wherein for the production of the output signals at three different levels, each sensing means associated with other than the most finely divided track is arranged to scan the respectively associated track through at least two slits spaced apart in the direction of the displacement of the second carrier relative to the scanning means.

* * * * *